Aug. 28, 1945.  A. G. KANDOIAN  2,383,489
METHOD AND MEANS FOR CONTROLLING HORIZONTAL PATTERNS FOR GLIDE PATHS
Filed March 6, 1941  7 Sheets-Sheet 1

INVENTOR.
ARMIG G. KANDOIAN
BY
ATTORNEY

SOLID LINE EXPERIMENTAL ATTENUATION (SLOPE 1.91)
DOTTED " INVERSE SQ.           ( " 2.00)

INVENTOR.
ARMIG G. KANDOIAN
BY
ATTORNEY.

Aug. 28, 1945.  A. G. KANDOIAN  2,383,489
METHOD AND MEANS FOR CONTROLLING HORIZONTAL PATTERNS FOR GLIDE PATHS
Filed March 6, 1941   7 Sheets-Sheet 4
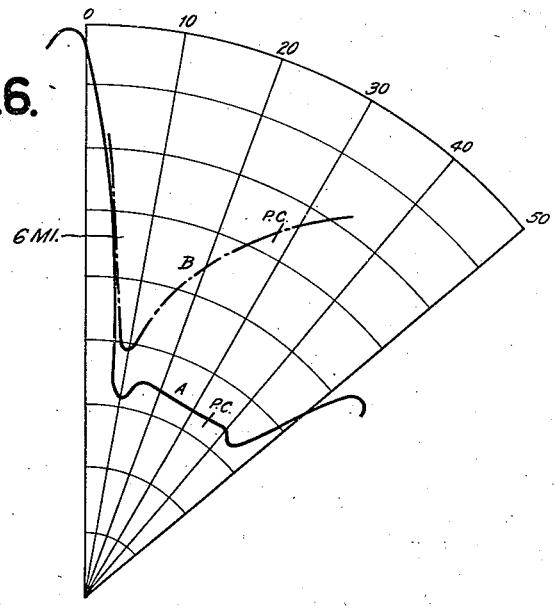
A-INDIANAPOLIS GLIDE PATH -1800 FT. BACKSET
B-SAME THEORETICAL PATH- 2800 FT. BACKSET
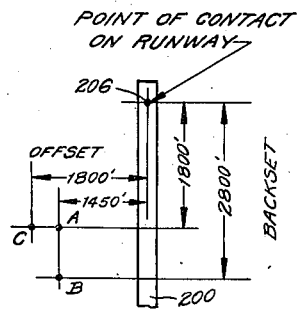
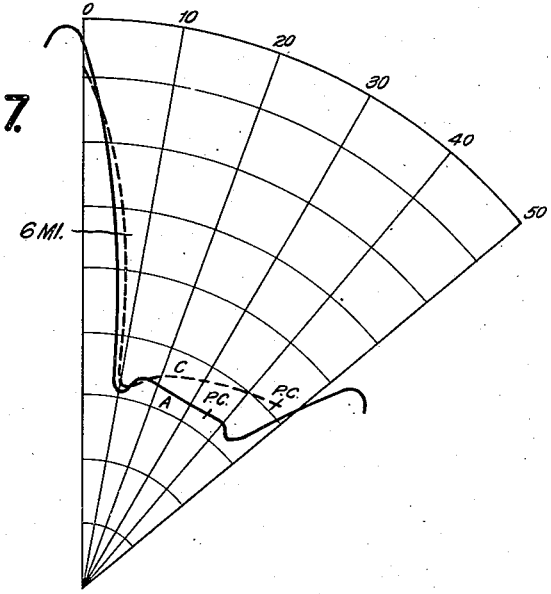
A-INDIANAPOLIS GLIDE PATH -1450 FT. OFFSET
C-SAME THEORETICAL PATH -1800 FT. OFFSET
(LESS SHARP)
INVENTOR.
ARMIG G. KANDOIAN
BY
ATTORNEY

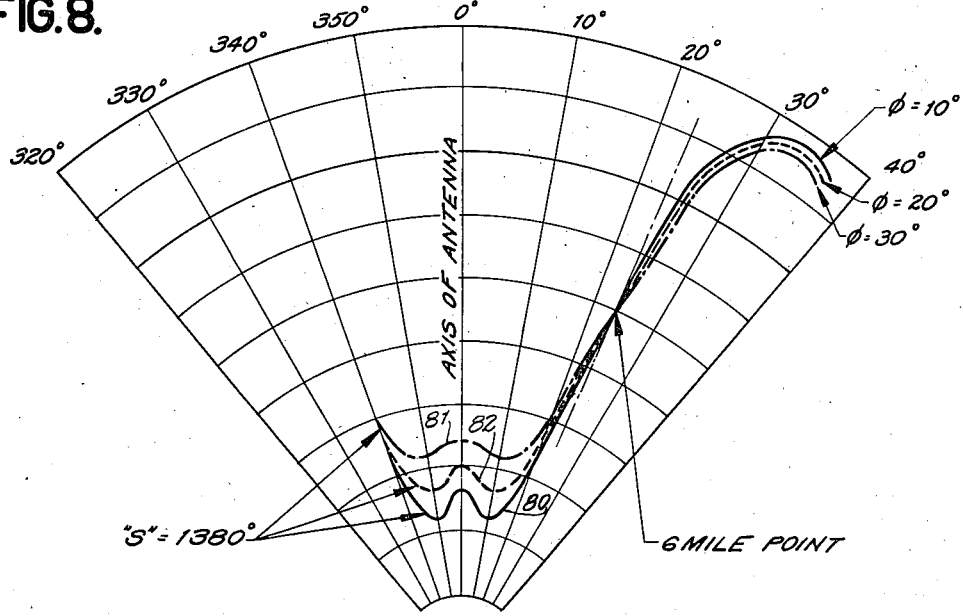
FIG. 8. EFFECT OF PHASE VARIATION OF CENTER LOOP ON HORIZONTAL FIELD PATTERN
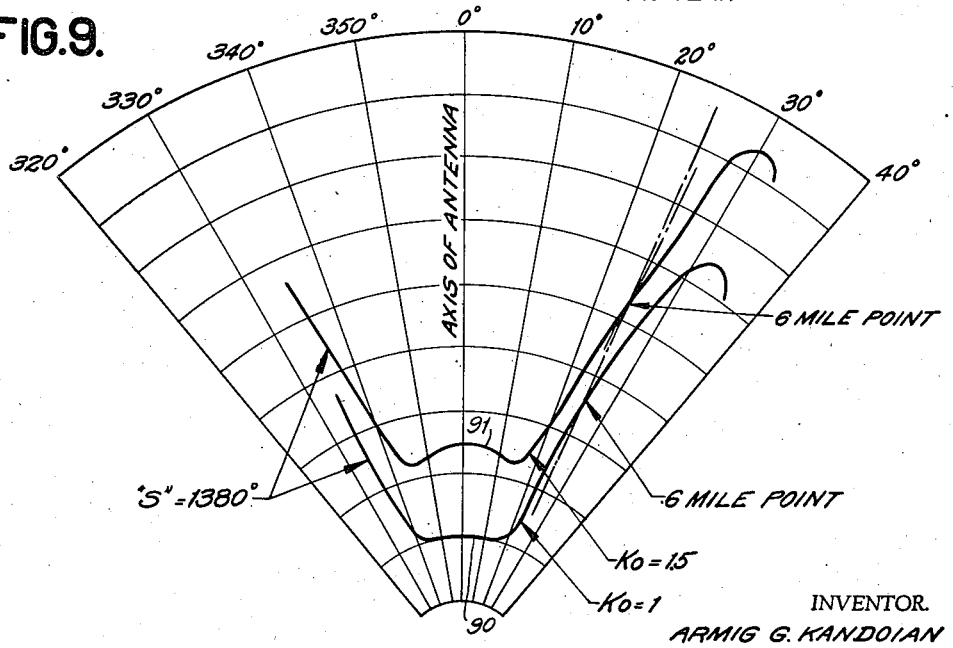
FIG. 9. EFFECT OF AMPLITUDE OF RADIATION FROM CENTER LOOP ON HORIZONTAL FIELD PATTERN
INVENTOR.
ARMIG G. KANDOIAN

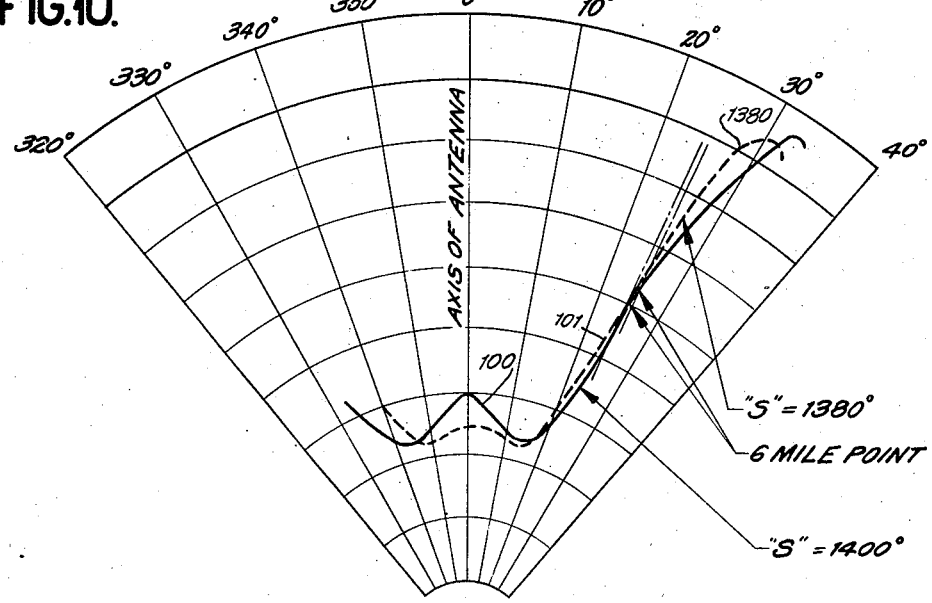
FIG. 10. Effect of small variations in "S" on horizontal field pattern
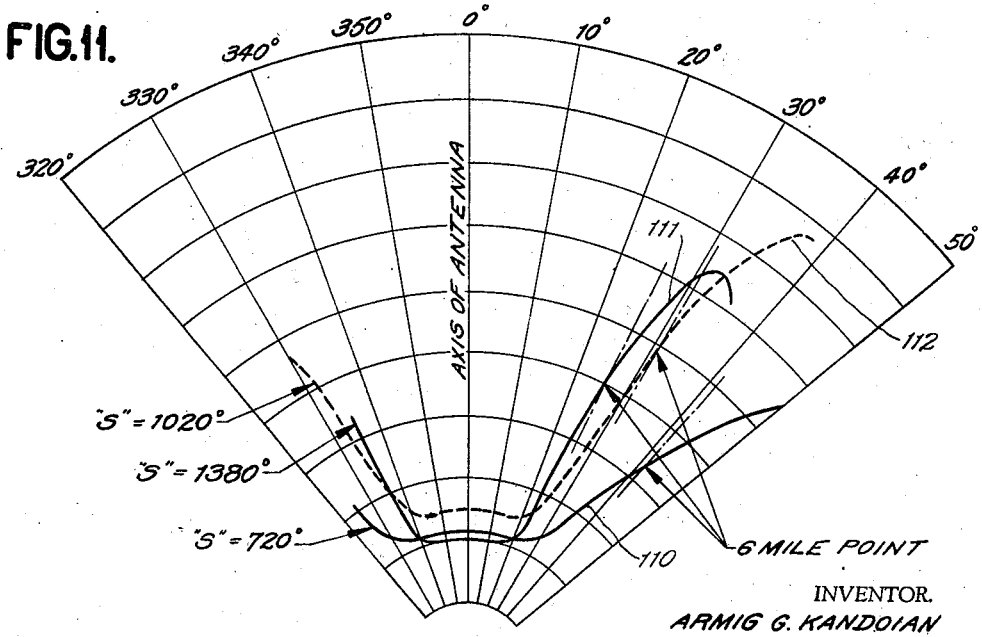
FIG. 11. Effect of large variations in "S" on horizontal field pattern
INVENTOR.
ARMIG G. KANDOIAN
BY
ATTORNEY

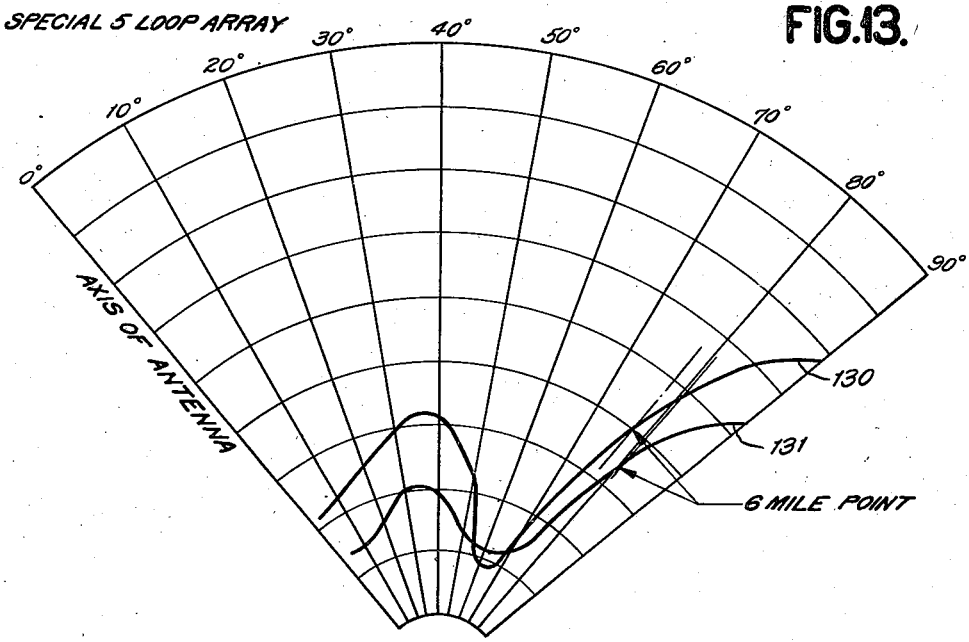
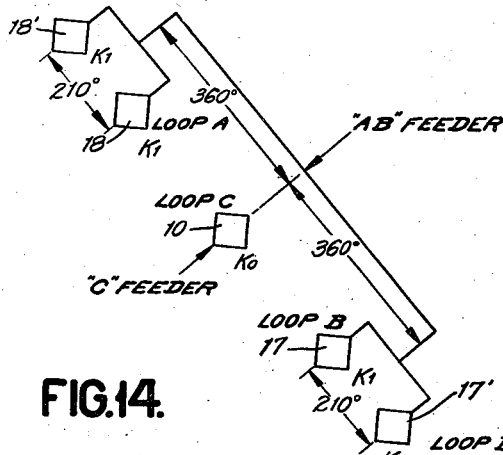
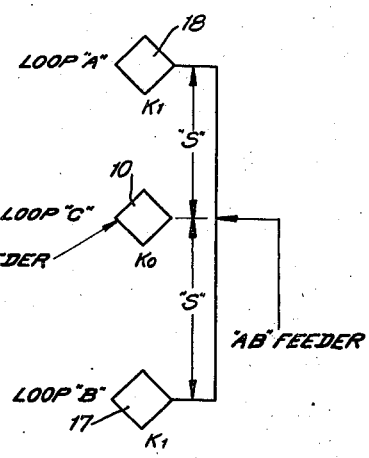

Patented Aug. 28, 1945

2,383,489

UNITED STATES PATENT OFFICE 2,383,489

METHOD AND MEANS FOR CONTROLLING HORIZONTAL PATTERNS FOR GLIDE PATHS

Armig G. Kandoian, New York, N. Y., assignor to Federal Telephone and Radio Corporation, a corporation of Delaware Application March 6, 1941, Serial No. 381,955

9 Claims. (Cl. 250—11)

This invention relates to antenna arrays and more particularly to antenna arrays arranged to produce field patterns forming a constant intensity path for defining a landing glide path.

The usual parabolic curve formed by the constant intensity lines of the radiation pattern from an antenna in the vertical plane have been used as a glide path beacon for landing aircraft. This pattern is not entirely satisfactory, however, since the parabolic curve is generally too steep at high altitudes and too flat near the point of contact at the landing field.

To overcome this difficulty straight line glide paths have been proposed, but these suffer from another defect. The rate of descent being substantially constant the aircraft reaches the point of contact at a considerable angle to the ground causing a severe shock.

The preferred type of glide path has been found to be one that is substantially rectilinear at the higher altitudes and decreases in slope, or levels off, near the point of contact. Such a path is thus substantially hyperbolic in shape.

This type of landing curve has been produced by providing a beacon having a radiation pattern which is relatively uneven in distribution in the horizontal plane, and arranging the radiators producing this pattern so that the center of radiation is offset to one side of the landing line. In the copending application of Andrew Alford, Serial No. 316,732, filed February 1, 1940, such a system is more fully described.

This last system, however, depends upon the addition of radiation from a main radiator and a separate radiator displaced to one side thereof consequently producing a radiation pattern which is unsymmetrical in the horizontal plane. The adjustment of the pattern form is thus relatively complicated to calculate. Moreover, experimental check of the pattern must be made at a relatively long distance from the radiating units, because of the unsymmetrical arrangement of the units and their relative wide spacing.

According to my invention, I provide a system for producing a desired landing curve of the constant intensity type by use of a symmetrical antenna array consisting of a central main radiator and two or more auxiliary radiators, symmetrically spaced on either side of the main radiator. This array produces a radiation pattern of desired form, and when properly spaced from the landing path of the aircraft will form a substantially hyperbolic landing line. The desired pattern shape may be precalculated and may be varied at will to suit a particular landing field. The shape may be varied by choosing the desired spacing of the auxiliary radiators with respect to the central radiator, by adjusting the relative phasing of the antenna units, by adjusting relative amplitudes of energization of the separate units, by adding other auxiliary units, or by combinations of any or all of these adjustments.

Moreover, the pre-calculated horizontal radiation distribution may be readily checked from the ground at a relatively short distance from the antenna array.

It is seen that my invention provides a flexible readily controlled system for providing a desired landing glide path beacon. A better understanding of my invention and the objects and features thereof may be had from the particular description of some practical embodiments thereof made with reference to the accompanying drawings in which:

Fig. 5 is an illustration showing the relative location of the beacon with respect to the landing runway.

Figs. 6 and 7 are fragmentary polar diagrams of the horizontal field pattern showing forms necessary for different back-set and off-set locations of the beacon.

Figs. 8, 9, 10 and 11 are fragmentary horizontal polar diagrams showing the effect of phase variation, amplitude adjustment, and small and large adjustment of spacing of antennae in the array.

Fig. 12 shows the relative arrangement of the beacon radiators with respect to the patterns of Figs. 8–11.

Fig. 13 is a quadrant of a horizontal radiation diagram for a beacon having more units, and Fig. 14 shows the relative arrangement of units for production of the diagrams of Fig. 13.

In order that a landing glide path for an aircraft may be determined so as to follow the proper line, it is necessary that a suitable distribution of the radiated energy be achieved. Since glide path beacon installations must be made at various landing fields in a different location with respect to the runways at these fields, it is desirable that a simple radiating system for producing such glide paths should be developed. However, in view of the differences which exist at various airports, no fixed single pattern can be used for such glide path antennae arrays. Accordingly, it is desirable that an array which is as simple as possible under the circumstances be provided, and that such a system be readily adjustable to suit the conditions found at various airports.

In order to achieve the desired distribution a simple array may be provided having a central main radiating means. This central radiating means in its simplest form comprises a single radiator which normally produces substantially omnidirectional radiation. In special cases this radiating means may comprise two or more units arranged to secure a directive distribution of the energy. In order to define a desired type of glide path having a substantially hyperbolic landing curve, it is necessary that radiations from the beacon be varied in horizontal distribution from the pattern obtained by the central radiator alone. According to my invention this variation in horizontal distribution is provided by means of auxiliary radiators spaced symmetrically on either side of the radiating means. These auxiliary antenna units are either simple antenna elements or may consist of an array of units as desired. Energy is supplied to the central radiator from the transmitter and in general a smaller amount of energy is supplied to the auxiliary radiating means and adjusted in amplitude and phase to produce the desired horizontal radiation distribution.

Figure 1:
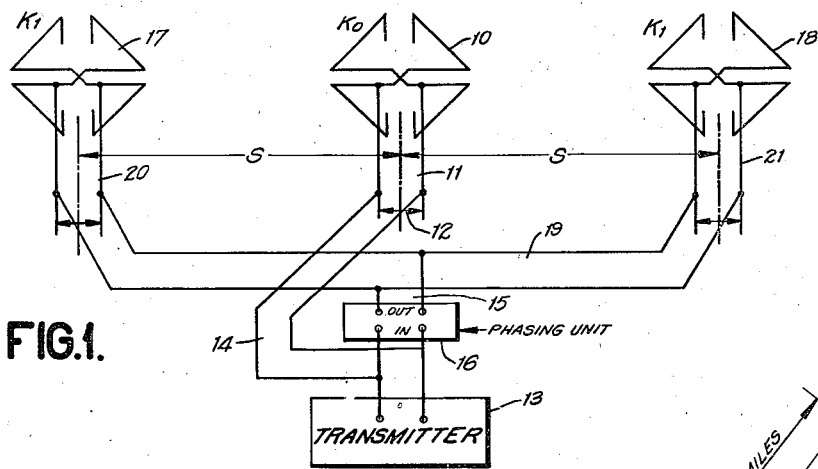
Fig. 1 illustrates a simple antenna array according to my invention.

In Fig. 1 is shown a simplified diagram illustrating the simplest form of radio beacon, in accordance with my invention. This array comprises a central radiator 10, which in this instance is shown to be an antenna for producing substantially horizontal polarizations. It is clear, however, that any type of unit desired may be provided. Antenna 10 is tuned by means of a transmission line section 11, with an adjustable short circuiting means 12 and is energized with energy from transmitter 13 over line 14. Line 14 is adjusted with respect to the provision of short circuiting bar 12 so as to transfer to antenna 10 the desired amplitude of energy.

A second branch line 15 connected to transmitter 13 through a phasing unit 16, supplies energy to auxiliary units 17, 18 over a line 19. The amount of energy supplied to antennae 17, 18 is controlled by adjusting the coupling point of line 19 with respect to tuning elements 20, 21 respectively. Preferably the energy supplied to each of antennae 17, 18 is less than that supplied to antenna 10. The phasing unit disclosed only as a block diagram may be any known type, for example, it may be merely an adjustable extension in transmission line 15. The energy supplied to antenna 10 is designated as $K_0$, and that to each of antennae 17, 18, as $K_1$. The spacing between central antenna 10 and auxiliary antennae 17, 18 is designated by S. The value of S, $K_0$ and $K_1$ is determined at each installation depending upon the distribution desired. Also, the particular phase adjustment of energy supplied to auxiliary units 17 and 18, with respect to that supplied to 10, is adjusted at each installation to the desired relation.

Figure 2:
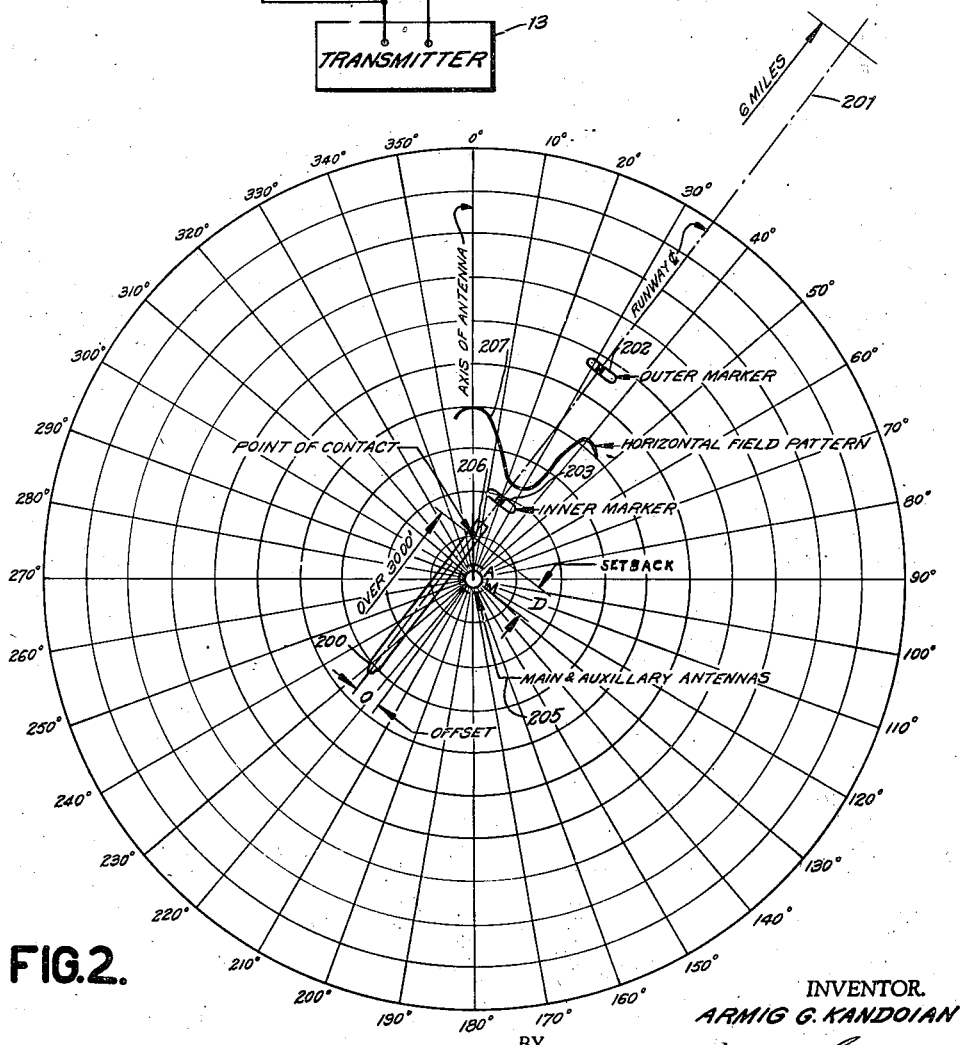
Fig. 2 shows a plan view of a landing field layout using a beacon according to my invention.

A typical landing field layout utilizing a glide path beacon in accordance with my invention is disclosed in Fig. 2. In this arrangement the landing runway is shown at 200 and the glide path plane for guiding aircrafts to a landing is indicated by the dot-dash line 201. The usual outer and inner marker beacons 202, 203 are shown arranged in line with the glide path. The system at a landing field generally includes a localizer beacon for defining the glide path plane. However, in order to simplify the showing, such localizer beacon is not shown in Fig. 2. The antenna array for supplying the desired glide path beacon radiation is indicated at 205, and is aligned with the zero degree line on the drawing.

The beacon is arranged at one side of the runway by a spacing O indicated by the term "offset" and is set back of the point of contact 206 where the aircraft comes in contact with the runway by a distance D termed the "set-back." In order that the aircraft be enabled to follow a suitable glide path to landing the horizontal radiation pattern from antenna 205 must be properly shaped, and this shaping is indicated by the curve 207 of Fig. 2.

Figure 4:
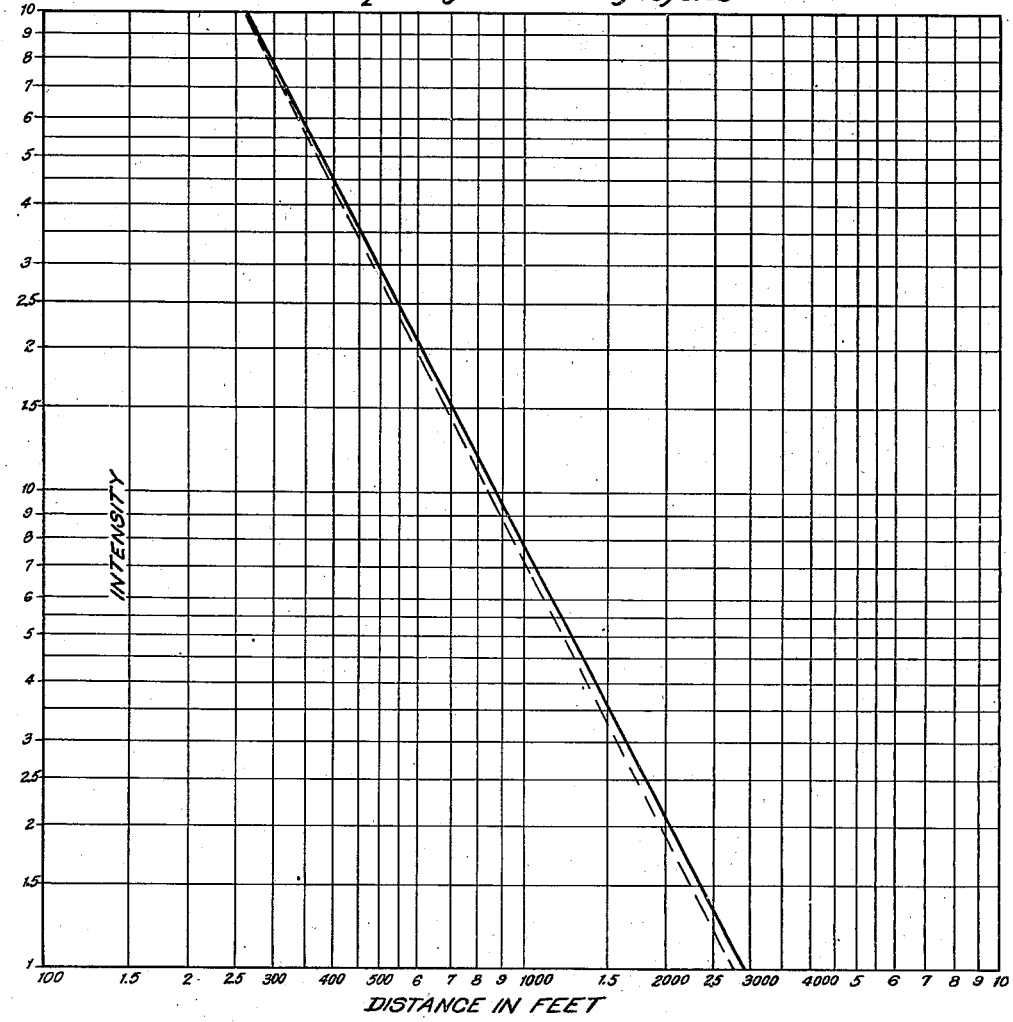

Experiment shows that at any point a given distance X along the glide path, the field radiated from an antenna is very nearly proportional to the heighth Y above ground so long as the ratio of this heighth to the distance is less than .05 and the heighth of the antenna system above ground does not exceed approximately two wavelengths. Furthermore, experiment shows that at a given heighth above ground the field strength varies approximately as the reciprocal of the horizontal distance R from the radiator squared. This latter relation depends upon the constants of the particular type of ground encountered and will vary somewhat with different types of ground. Fig. 4 shows an experimental constant height field strength attenuation curve, the dotted line showing the theoretical relationship based upon the reciprocal square relationship. This experimental measurement was made at the landing field at Indianapolis and may be considered as an approximate average of that of the ground which will be encountered at most airports.

Figure 3:
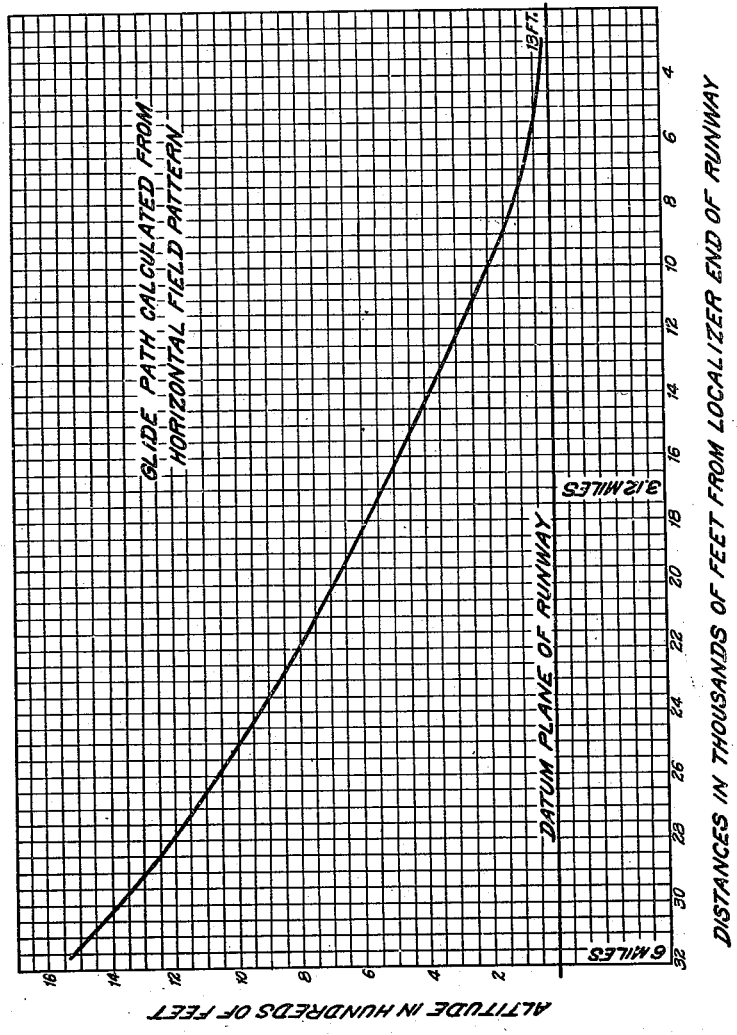
Figs. 3 and 4 are curves illustrating the operation of a beacon built in accordance with my invention.

Figure 3 illustrates a typical glide path curve calculated from a horizontal field pattern. Actual experiment indicates that such a curve is substantially the same as that achieved in actual practice.

In accordance with the above discussion the field $f$, received by the receiving antenna on an airplane flying along the course at a distance from the point of contacts and at a heighth Y above ground and at a distance R from the beacon, is given by the equation $$f = \frac{KF(\theta)Y}{R^2} \quad (1)$$

where K is a constant of proportionality, and $F(\theta)$ is the intensity of radiation, which is a function of horizontal angle $\theta$.

This equation may be used in different ways for calculating the desired horizontal distribution for achieving the proper form of landing path.

Assuming values for offset O and backset D and a glide path to be produced in given terms from a table of values for Y for different values of R, the shape of the horizontal pattern of the glide path antenna may be calculated. Also, a different calculation may be made asuming values for the parameters O and D, and the radiation pattern of the glide path antenna given, for example, by a table of $F(\theta)$ the shape of the glide path which will be produced under these conditions may be calculated.

In addition this equation may be used to determine the manner in which the radiation pattern of the glide path antenna will vary with different values of offset O and backset D when the shape of the glide path remains fixed. This is illustrated in Figs. 5 to 7 of the drawings. In Figure 5 a portion of runway 200 is shown and points A, B and C, indicate the various positions for the antenna array 205. In Fig. 6 curve A indicates the horizontal distribution necessary to provide a glide path of the type shown in Fig. 3 with the antenna array 205 located at point A, while curve B indicates the variation in field pattern that is necessary to produce the same glide path when the antenna is located at point B.

Fig. 7 is a similar arrangement showing the effect of offset wherein curve A represents the radiation pattern necessary to produce the glide path with the array located at point A and curve C, the distribution necessary when the array is set further to one side at point C, of Fig. 5. In each of Figs. 6 and 7 the letters P. C. indicate point of contact 206. The degree of accuracy on the basis of Equation 1 is very high, since the calculated curve of Fig. 3 was shown by experiment to very accurately follow the curve produced by an actual installation at Indianapolis.

Although the calculated glide path is found to very accurately check where a fairly flat terrain exists, this calculated value may not always be accurate in hilly surroundings. In such cases it may be necessary to determine some of the values experimentally before details of the radiating system may be designed. This measurement may be achieved as follows: A single radiating antenna producing a normally substantially omnidirectional pattern is set up at the center of radiation of the proposed location of the transmitter. An airplane is then flown along a path simulating the desired glide path and picking up signals on a recorder from a linear or television receiver. An observation will be made of the altitude and distance marks at the same time that the readings are made. By the reciprocity law the field that would have produced a constant intensity glide path of the shape desired, may then be derived. From this it will be readily possible to immediately obtain the factor by which the radiation from the glide path antenna must be increased or decreased in various directions to produce the glide path along the line of flight, and from this value to approximate the desired horizontal characteristics. However, in most cases the variations in the terrain will not be so severe as to require such additional measurements.

A simple three loop array of the type shown in Fig. 1 in accordance with my invention may be readily adjusted to produce the desired horizontal distribution to achieve the results as indicated above. The axis of the array is defined as the line in which the antenna units are arranged. This is generally aligned with the point of contact or between the point of contact and the outer marker beacon. In general two loops 17, 18, are fed with energy displaced in phase slightly with respect to the central radiator, and may be in phase or 180° phase relation with respect to one another. The two loops will produce a pattern which is symmetrical about the axis of the system. The pattern produced by these units will consist of a number of lobes separated by nulls, the distance between the units determining the number of lobes. When the distance 2S between units 17, 18, is made an even number of half-wave lengths and these units are approximately 180° out of phase there will be a null along the axis of the system and will be lobes on each side of this null. These lobes added to the radiation from a central antenna 10 serve to produce a composite desired pattern. The angle suspended by the two lobes depends on the spacing between the units 17, 18, and the depth of the null between the lobes, as well as the shape of the radiation pattern between them, may be readily controlled.

The variation in pattern may, for example, be adjusted by controlling the phase difference in the energy supplied to the units 17 and 18 with respect to that applied to radiator 10. In Fig. 8 the effect of this phase variation is shown for three antenna units wherein the spacing S is 1380 electrical degrees, $K_0$ current amplitude in antenna 10 is 1.2, and $K_1$ energy in each of the antennae 17, 18, is 0.5. Curve 80 shows the relationship when the phase difference $\phi$ between the radiation due to the center radiator and outer units is 10°, curve 81 wherein the $\phi$ is 20°, and curve 82 where $\phi$ is 30°.

Fig. 12 indicates the antennae 10, 17, and 18 arranged in diagrammatic form and may be considered as the arrangement for the antenna units for the pattern shown in each of Figs. 8 to 11, inclusive.

The effect of varying the relative power of energy applied to each of the antenna units is shown in Fig. 9. In this figure, S is again 1380°, $\phi$ is 30°, and $K_1$ is .5, curve 90 is the radiation pattern when $K_0$ is made equal to 1.5.

In Fig. 10 the effect of small variations in S on the radiating field pattern is shown. In this arrangement these curves were made with $K_0$ equal to 1.2, $K_1$ equal to .5, and $\phi$ equal to 30°. Curve 100 shows the pattern with a spacing S of 1400° and curve 101 the pattern when the spacing S is made equal to 1380°.

In Fig. 11 the effect of large changes in spacing is shown. In this arrangement $K_0$ is made equal to 1, $K_1$ is made equal to .5 and the angle $\phi$ is again 30°. Curve 110 shows the pattern for S equals 720°, curve 111 for S equals 1380° and curve 112 for S equals 1020°.

It is manifest from the study of Figs. 8 to 11, inclusive, that changes of the desired nature in the radiation pattern may be achieved by adjusting the spacing, the phasing or the relative energy fed to the antenna units of the array. It is clear that any of these adjustments alone or taken in any combination may be utilized to achieve the desired result. In order that the units do not produce an excessive number of lobes, the spacing between the central antenna 10 and the nearest auxiliary radiators 17 or 18, should not be too great. In the preferred arrangement the center of radiation of these auxiliary radiator systems is confined to a spacing of from 1 to 5 wavelengths from the center radiator, although spacings up to 10 wavelengths may be utilized.

It is clear that when an array of only three units is provided, considerable radiation in all directions around the system will occur. Furthermore, the amount of control obtainable with only two auxiliary units is limited and greater control may be desired. If greater flexibility is desired and it is also desired to cut down the amount of useless side radiation, the arrays may be made with a plurality of auxiliary units in place of single units. The effect of adding other units may be seen from a study of Figs. 13 and 14 wherein five radiating units are provided, instead of three. In this arrangement as shown in Fig. 14, the central radiator 10 is supplied at a point on either side by units 17, 17' and 18, 18'. The distance S measured to the center of radiation of the auxiliary units is made equal to 360° and the spacing between 17, 17' and between 18, 18' is made equal to 210°. The radiation patterns shown in Fig. 13 are determined for $K_0=1$, and $K_{11}=.25$, where $K_{11}$ corresponds to the energization of any one single auxiliary radiator. Curve 130 is the radiation pattern when $\phi$ is made equal to 20° and curve 131 when $\phi$ is made equal to 45°.

It is clear that in this arrangement variation in sharpness may be obtained by varying the spacing S similar to that pointed out in connection with the previous figures. Also, variations in the shape of the pattern may be achieved by adjusting the relative energization of the antenna units of the array. Likewise, a variation in the relative energization of units 17 and 17' may be provided to give a further adjustment.

The radiation diagram shown in Figs. 8 to 13, may be calculated from the following formula:

$$F(\theta) = \sqrt{4B^2 \sin^2 (s^o \sin \theta) + 4AB \sin (s^o \sin \theta) \cos \phi + A^2}$$

where $F(\theta)$ is the total radiation pattern in terms on angle $\theta$ from the normal to the antenna axis of symmetry; B is the radiation pattern of each of the auxiliary radiator groups, fed out of phase with respect to each other; A is the radiation pattern of the center radiator; and $\phi$ is the absolute value of phase difference between the radiation from the center group and the outer groups. In the cases where the two outer groups are fed in phase the equation becomes:

$$F(\theta) = \sqrt{4B^2 \cos^2 (s^o \sin \theta) + 4AB \cos (s^o \sin \theta) \cos \phi + A^2}$$

While I have disclosed a few specific examples of my invention it is clear that many variations thereof may be made within the scope of this application. What I consider to be my invention and desire to protect by Letters Patent is embodied in the accompanying claims.

What I claim is:

1. A glide path landing beacon system for producing a landing glide path substantially in a single vertical plane comprising a radiating arrangement consisting of central radiating means, and at least two separate auxiliary radiating means arranged substantially in line with said central radiating means on either side thereof to form an array, said auxiliary radiating means being spaced not closer than one wavelength from said central radiating means, means for supplying energy of a given frequency to said central radiating means at a predetermined power level, means for supplying energy of the same frequency and at a lower power level to each of said auxiliary radiating means, said array being arranged at one side of the vertical plane containing the landing glide path and back of the point of contact with the ground of an airplane following said glide path to a landing, and having its axis, determined by said line, related at a predetermined angle to said plane, dependent upon the desired glide path contour.

2. A glide path beacon system according to claim 1, further comprising means for adjusting the phase of the energy supplied to said auxiliary radiating means with respect to said central radiating means, to adjust the shape of said glide path.

3. A glide path beacon system according to claim 1, further comprising means for adjusting the relative power fed to said central radiating means and said auxiliary radiating means to adjust the shape of said glide path.

4. A glide path beacon system according to claim 1, further comprising means for adjusting the relative power and the phase relation of energy supplied to said central radiating means and said auxiliary radiating means to adjust the shape of said glide path.

5. A glide path beacon system according to claim 1, wherein the spacing between said central radiating means and the center of radiation of each of said auxiliary radiating means is between 360 and 3600 electrical degrees.

6. A glide path beacon system according to claim 1, wherein the spacing between said central radiating means and the center of radiation of each of said auxiliary radiating means is between one and five wavelengths at the operating frequency.

7. A glide path beacon system according to claim 1, wherein each of said auxiliary radiating means comprise at least two radiating units arranged substantially in line.

8. A glide path beacon system according to claim 1, wherein each of said auxiliary radiating means comprise at least two radiating units arranged substantially in line, further comprising means for adjusting the phase and the amount of energy supplied to said auxiliary radiating means with respect to said central radiating means.

9. The method of installing a glide path radio beacon for guiding aircraft to produce desired glide path in a particular direction from a substantially symmetrical linear antenna array located at a predetermined distance to one side of said glide path and back of the point of contact with the runway of an aircraft following said path to a landing, which comprises determining the horizontal radiation distribution for defining said glide path by producing a substantially omni-directional radiation field from the point at which said array is located, measuring the energy produced by said omni-directional field at points along said glide path and determining from the measurement of energy at these points the field strengths necessary to produce the desired glide path indication, supplying energy to the antennae of said array, and adjusting the relative amplitude, and phase of energy supplied to said antennae to produce said radiation distribution.

ARMIG G. KANDOIAN.